United States Patent
Dixneuf

(10) Patent No.: US 9,945,757 B2
(45) Date of Patent: Apr. 17, 2018

(54) TEMPERATURE-MEASURING DEVICE FOR A GAS PIPE CONNECTED TO A HEAT ENGINE OF A MOTOR VEHICLE, AND HEAT ENGINE AND VEHICLE PROVIDED WITH SAID DEVICE

(75) Inventor: Olivier Dixneuf, Moult (FR)

(73) Assignee: SC2N, Creteil (FR)

( * ) Notice: Subject to any disclaimer, the term of this patent is extended or adjusted under 35 U.S.C. 154(b) by 509 days.

(21) Appl. No.: 13/976,474

(22) PCT Filed: Dec. 20, 2011

(86) PCT No.: PCT/FR2011/053091
§ 371 (c)(1),
(2), (4) Date: Sep. 3, 2013

(87) PCT Pub. No.: WO2012/089960
PCT Pub. Date: Jul. 5, 2012

(65) Prior Publication Data
US 2013/0336361 A1 Dec. 19, 2013

(30) Foreign Application Priority Data

Dec. 30, 2010 (FR) ..................................... 10 61357

(51) Int. Cl.
*G01K 7/00* (2006.01)
*G01M 15/10* (2006.01)
(Continued)

(52) U.S. Cl.
CPC ............. *G01M 15/102* (2013.01); *G01K 1/14* (2013.01); *G01K 13/02* (2013.01); *F02M 26/47* (2016.02);
(Continued)

(58) Field of Classification Search
CPC ......................... G01R 31/2862; G01R 31/2867
(Continued)

(56) References Cited

U.S. PATENT DOCUMENTS 6,212,946 B1 * 4/2001 Naegele ............... G01D 11/245
374/E1.026
6,505,612 B1 * 1/2003 Cipressi .................. F02B 43/00
123/527
(Continued)

FOREIGN PATENT DOCUMENTS

DE        42 27 578 A1     2/1994
DE        4227578     *   2/1994
(Continued)

OTHER PUBLICATIONS

International Search Report issued in PCT/FR2011/053091 dated Apr. 26, 2012 (4 pages).

Primary Examiner — Lisa Caputo
Assistant Examiner — Janice M Soto
(74) *Attorney, Agent, or Firm* — Osha Liang LLP

(57) ABSTRACT

The invention relates to a device for measuring temperature in a gas duct. The device (1') comprises a body (3') for supporting a temperature sensor (4'), the sensor comprising a head (7') and at least two wires (8') connecting the head (7') to means for acquiring a temperature-measurement signal. The supporting body (3') is arranged so as to be inserted into an orifice of a wall of the duct in order to immerse the head (7') of the sensor (4') in the gases of the duct. The supporting body (3') comprises a bottom collar (12'), having a top end surface (17a'), in which are arranged at least two channels (9') for guiding and holding the wires (8'), arranged to allow the mounting of the sensor (4') in the supporting body (3') and the holding of the wires (8') in order to hold the head (7') of the sensor (4') at a distance from the top end surface (17a') of the collar (12').

15 Claims, 4 Drawing Sheets

(51) Int. Cl.
  *G01K 1/14* (2006.01)
  *G01K 13/02* (2006.01)
  *F02M 35/10* (2006.01)
  *F02M 26/47* (2016.01)

(52) U.S. Cl.
  CPC ..... *F02M 35/1038* (2013.01); *G01K 2205/02* (2013.01)

(58) Field of Classification Search
  USPC .................................................. 374/208, 138
  See application file for complete search history.

(56) References Cited

U.S. PATENT DOCUMENTS

| | | | |
|---|---|---|---|
| 8,192,078 B2* | 6/2012 | Gebauer | G01D 11/24 374/143 |
| 2004/0101031 A1* | 5/2004 | Kotwicki | G01K 1/16 374/185 |
| 2008/0205485 A1* | 8/2008 | Takahashi | G01K 1/14 374/208 |
| 2010/0067562 A1* | 3/2010 | Wakabayashi | G01K 1/14 374/208 |

FOREIGN PATENT DOCUMENTS

| | | | |
|---|---|---|---|
| DE | 10 2009 000597 A1 | | 8/2010 |
| DE | 102009000597 | * | 8/2010 |

\* cited by examiner

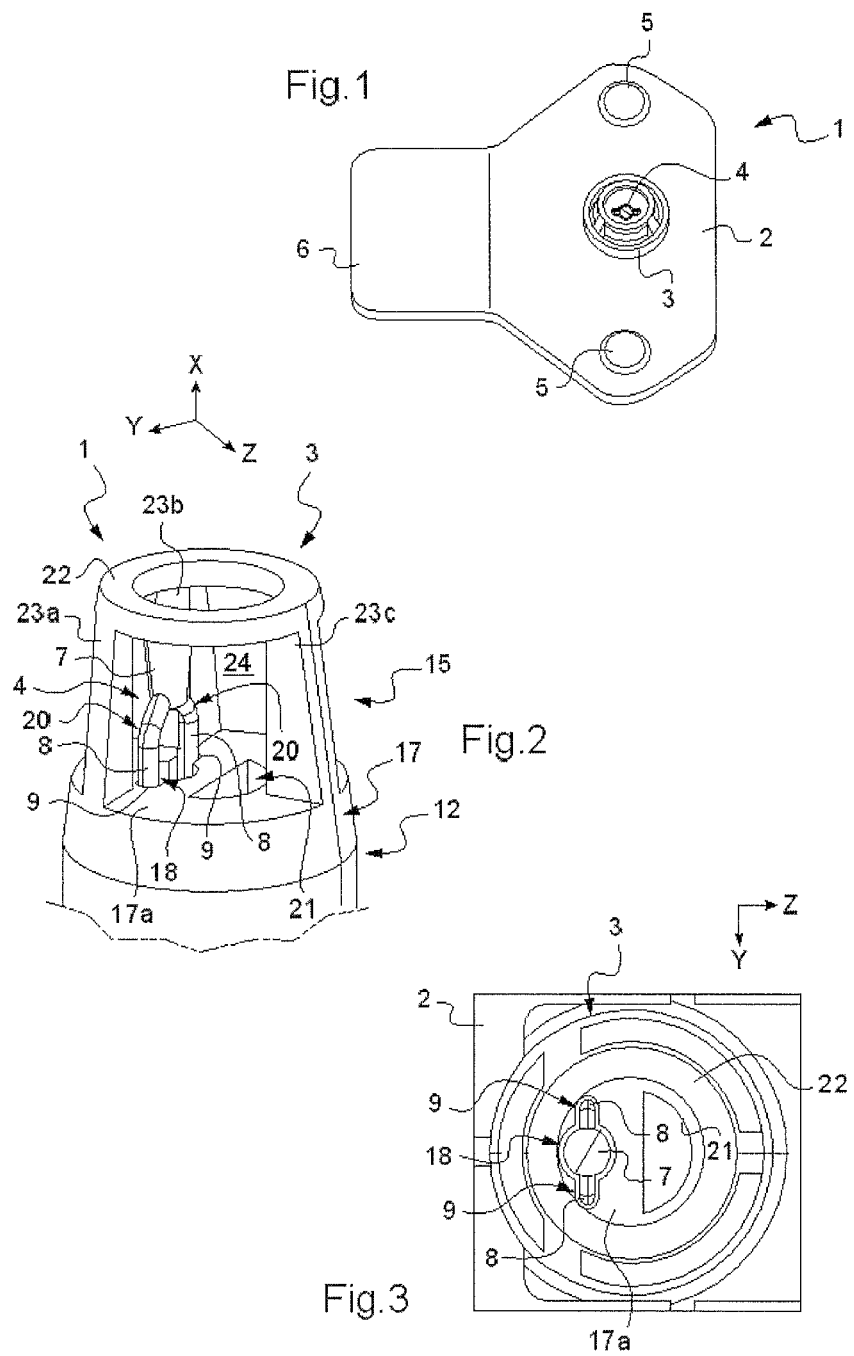

TEMPERATURE-MEASURING DEVICE FOR A GAS PIPE CONNECTED TO A HEAT ENGINE OF A MOTOR VEHICLE, AND HEAT ENGINE AND VEHICLE PROVIDED WITH SAID DEVICE

The present invention relates to a device for measuring temperature for a gas duct, preferably connected to a heat engine of a motor vehicle, and a heat engine and a vehicle fitted with such a device.

"Duct" means any pipe for the circulation of gas, including optionally a part of noncylindrical shape such as a gas inlet manifold. The invention applies particularly well to temperature sensors used in the inlet circuit or the gas inlet manifold of a heat engine of a motor vehicle.

Such temperature sensors are usually connected to an electronic control unit or engine computer (commonly known by the acronym ECU for Engine Control Unit). This electronic control unit monitors and controls the operation of the engine based on the information that is sent to it by the temperature sensors and by other sensors such as, for example, oil-level sensors or pressure sensors, this information making it possible to carry out the control of the engine.

In particular, when the engine comprises a circuit for recirculation of the exhaust gases, by which a portion of the exhaust gases is reinserted at the intake of the engine and mixed with the intake air, the data transmitted by the temperature sensors are used by the ECU to adjust the flow rate of the recirculated exhaust gases. The recirculation of the exhaust gases is well known to those skilled in the art and commonly known by the acronym EGR for Exhaust Gas Recirculation.

The temperature sensors with application in heat engines are usually mounted on a support in the form of a plate designed to be attached to the wall of the gas duct and having, protruding from the plate, a body for supporting and protecting the sensor designed to be inserted through the wall of the duct, in an orifice provided for this purpose, in order to allow the sensor to protrude inside the duct and to be immersed in the gas flow in order to be able to measure its temperature.

In the automobile field, the sensors that are conventionally used are thermistors, that is to say ohmic conductors of which the electrical resistance value depends on the temperature; the signal measured at the terminals of the thermistor therefore makes it possible to ascertain the temperature of the gases to which the thermistor is exposed. The thermistors used are frequently thermistors known as NTC, the acronym for Negative Temperature Coefficient, thermistors of which the resistance reduces with the temperature.

A sensor supporting body is usually of substantially hollow cylindrical shape to house the sensor. The latter comprises a head from which extend at least two electric wires connected (directly or indirectly) to the ECU.

To make it possible to deduce, from the measurement of the resistance of the sensor, the temperature value of the gases, the head of the sensor must be placed at least partly in the flow of gases of the duct, in order to be swept by the gases. The more the sensor is swept by the gases, the better is its temperature measurement. The supporting body of the sensor is therefore arranged so that the head of the sensor is subjected as well as possible to the gases of the gas flow travelling in the duct.

However, because of this exposure to the gas flow, the head of the sensor is subjected to pulses of gas which are inherent in the operation of the engine since they are generated on each intake of gas by one of the cylinders of the engine. Such pulses cause the wearing of the sensor; in point of fact there are tens of millions of gas pulses over the lifetime of a vehicle.

In order to protect the head of the sensor from these gas pulses, a device for measuring temperature is already known that has a supporting and protective body having means for holding the head substantially in one and the same position relative to the body. These holding means comprise a tongue placed inside the housing of the body, extending along the head and serving as a support for the latter in order to hold it under the effect of the pulses.

However, the presence of these holding means increases the response time of the sensor for measuring the temperature. Specifically, the closeness and the contact between the head of the sensor and the supporting tongue reduce the capacity of the head to change temperature in a satisfactory response time; accordingly, the greater the mass of the whole of the head and its environment, the greater its thermal inertia and the longer it takes to change temperatures, that is to say the longer the response times of the sensor.

It is one object of the present invention to propose a device for measuring temperature that allows the holding of the sensor, subjected to the gas pulses of the engine, relative to the body that supports it, while ensuring a rapid response time of this sensor.

The invention applies particularly well to a device for measuring the temperature of the gases of an intake circuit of a heat engine of a motor vehicle with recirculation of the exhaust gases, but it goes without saying that the Applicant does not intend to limit the scope of its rights to this sole application, the invention applying more generally to any gas duct of a motor vehicle and more generally still to any gas duct.

Furthermore, the invention applies particularly well to a sensor of the NTC thermistor type, but it goes without saying that the Applicant does not intend to limit the scope of its rights to this sole application, the invention applying more generally to any sensor allowing the measurement of temperature.

It is in this way that the invention relates to a device for measuring temperature in a gas duct, the device comprising a body for supporting a temperature sensor, the sensor comprising a head and at least two wires connecting the head to means for acquiring a temperature-measurement signal, the supporting body being arranged so as to be inserted into an orifice of a wall of the duct in order to immerse the head of the sensor in the gases of the duct, said device being characterized in that the supporting body comprises a bottom collar, having a top end surface, in which are arranged at least two channels for guiding and holding the wires, arranged to allow the mounting of the sensor in the supporting body and the holding of the wires in order to hold the head of the sensor at a distance from the top end surface of the collar.

By virtue of the device for measuring temperature of the invention, the holding of the sensor in the body is ensured while providing it with a rapid response time for the temperature measurement; specifically, the guidance and holding channels fulfill a function of holding the head of the sensor at a distance from a top end surface of the collar and a function of keeping the wires bent; the sensor head may be held while being disengaged from any holding means. Thus, in the direction of flow of gases, the head is totally disengaged from the collar of the body; it can therefore be submerged in the gas flow and its response time is improved, since its thermal inertia is reduced.

Note that the concepts of top and bottom are taken by convention in order to situate the elements of the device relative to one another. It is clearly understood that, since the supporting body extends generally in one direction, it is inserted into the orifice of the duct in this direction, the top side of the supporting body corresponding to the inside of the gas duct and the bottom side of the supporting body corresponding to the outside of the gas duct.

According to one advantageous embodiment, since the gases flow generally in one direction, the wires are kept bent in said direction of flow of the gases.

In other words, the wires are kept bent in order to prevent then from flexing in this direction because of the forces parallel to the latter, these forces being imparted by the flow of the gases.

According to one advantageous embodiment, the bottom collar comprises a channel for the passage of the head of the sensor so that it can be mounted in the supporting body.

According to a preferred embodiment, the channel for the passage of the head of the sensor is situated between the guidance and holding channels of the wires.

According to one advantageous embodiment, each wire is arched close to the head of the sensor, for example between the head of the sensor and its guidance and holding channel and/or close to the top end surface of the collar.

Its stiffness in bending is thus improved.

According to one advantageous embodiment, the width of the channels is substantially equal to the diameter of the wires.

Thus, the channels allow only a slight range of movement of the wires, which improves keeping them bent and hence holding the head of the sensor.

According to one particular embodiment, since the bottom collar extends generally along an axis (the collar being for example of generally cylindrical shape), it comprises a wall substantially transverse to its axis in which the channels are arranged, the channels being pierced longitudinally in said wall (that is to say parallel to the general axis of the collar).

According to one particular embodiment, since the bottom collar extends generally along an axis (the collar being for example of generally cylindrical shape) and comprises at least one side wall (for example substantially cylindrical), it comprises at least two longitudinal legs protruding radially inside said side wall, each channel being arranged between a leg and the side wall of the collar.

According to one particular embodiment, since the bottom collar extends generally along an axis (the collar being for example of generally cylindrical shape) and comprises at least one side wall (for example substantially cylindrical), it comprises two pairs of longitudinal legs protruding radially inside said side wall, each pair of legs arranging a channel.

In other words, the legs of one or the other of these embodiments extend longitudinally, that is to say parallel to the general axis of the collar, and protrude radially from an inner surface of the side wall of the collar.

Advantageously, the legs of one or the other of these embodiments are formed to allow the passage and the guidance of the head of the sensor for mounting it in the supporting body.

According to one advantageous embodiment, the device comprises at least one supporting tongue for a wire, protruding from the top end surface of the bottom collar and of which a top end surface extends at a distance from the head of the sensor.

The action of such a tongue supplements the action of the channel for guiding and keeping the wire bent, without, for all that, adversely affecting the response time of the sensor since the top end surface of the tongue extends at a distance from its head.

According to one advantageous embodiment in this case, since the gases flow generally in one direction, the wire and its supporting tongue are aligned in said direction of flow of the gases.

Thus, the tongue can serve as a support for the wire in order to prevent it from bending in the direction of flow of the gases.

According to one advantageous embodiment in this case, the supporting tongue is arranged to force the wire to rest against an inner surface of its guidance and holding channel.

In this way, keeping the wire bent is yet further ensured, the wire being immobilized in position, even jammed, between the tongue and the inner wall of its guidance and holding channel.

According to one advantageous embodiment, the supporting body comprises a top framework, for protection of the head of the sensor, protruding from the top end surface of the bottom collar, arranging at least one passage for the gases and consisting of walls all extending at a distance from the head of the sensor.

Thus, the head of the sensor is protected while being well exposed to the gases for an effective measurement of their temperature.

Advantageously, since the supporting body extends generally along an axis, the framework comprises at least one longitudinal pillar protruding from the top end surface of the bottom collar and, since the gases flow generally in one direction, a longitudinal pillar of the framework on the upstream side of the head of the sensor and the head of the sensor are aligned in said direction of flow of the gases.

It is of course necessary to maintain a distance, for example more than one millimeter, between the head of the sensor and the walls of the protective framework in order to limit the problems of thermal inertia, and have more space around the sensor head to allow the gases to pass.

Alternatively, since the supporting body extends generally along an axis, the framework comprises at least one longitudinal pillar protruding from the top end surface of the bottom collar and, since the gases flow generally in one direction, no longitudinal pillar of the framework on the upstream side of the head of the sensor is aligned with the head of the sensor in said direction of flow of the gases.

The head of the sensor can therefore be directly exposed to the gases without the longitudinal wall or walls of the framework causing an obstruction to their flow toward the head.

According to one advantageous embodiment, the duct is a gas inlet duct of a heat engine of a motor vehicle.

According to one advantageous embodiment, the temperature sensor is a thermistor of the NTC type.

The invention also relates to a heat engine of a motor vehicle connected to at least one duct comprising a device for measuring temperature like that explained above.

The invention also relates to a motor vehicle comprising a heat engine connected to at least one duct comprising a device for measuring temperature like that explained above.

The invention will be better understood with the aid of the following description of preferred embodiments of the invention, with reference to the appended drawing plates in which:

FIG. 1 represents a schematic view in perspective of a first embodiment of the device for measuring temperature of the invention;

FIGS. 2 and 3 represent respectively a schematic view in perspective and a schematic view from above of the body for supporting and protecting the device for measuring temperature of FIG. 1;

Figure 4:
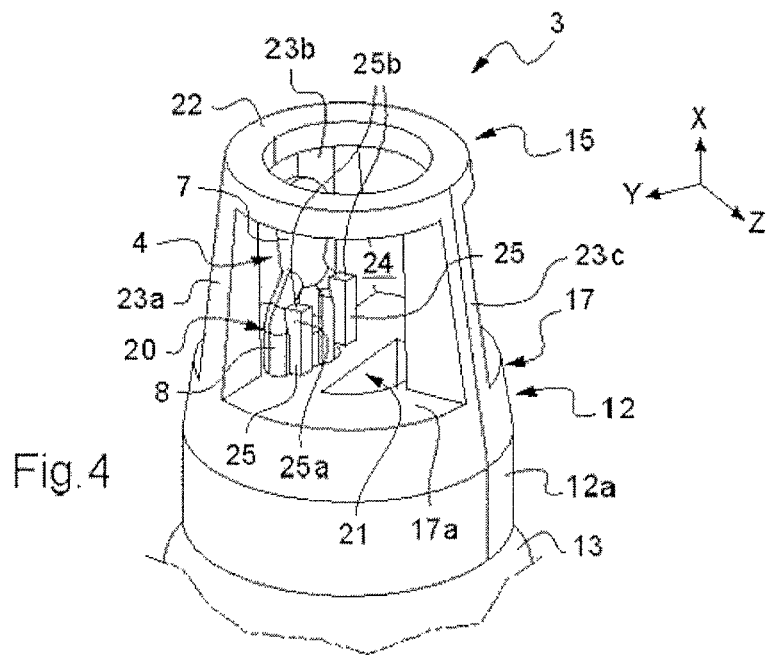
FIG. 4 represents a schematic view in perspective of a variant embodiment of the device for measuring temperature of FIGS. 1 to 3.

All the figures relate to a device 1, 1', 1", 1''' for measuring the temperature of the gases circulating in a gas duct (not shown) connected to a heat engine of a motor vehicle, such as, for example, a gas inlet duct connected to a gas recirculation duct of the EGR type, as explained above.

In a first part of the description, the portions common to the various embodiments will be described. "Common portions" means the elements that are structurally or functionally identical, equivalent, similar or comparable in all the embodiments. The various elements of the devices of the three embodiments are designated by identical reference numbers in all the figures, but with primes ('), double primes ("), or triple primes ("') for the second, third and fourth embodiments; thus, and as an example, the device is designated by the reference 1 in FIGS. 1 to 4 (first embodiment), 1' in FIG. 5 (second embodiment), 1" in FIGS. 6 and 7 (third embodiment), and 1''' in FIGS. 8 to 10 (fourth embodiment).

In a second part of the description, the specifics of each embodiment will be described. In order to simplify the description, since the embodiments are fairly similar, not all of the description of the elements of the devices will be repeated, since the description of the parts common to the three embodiments and that of the other embodiments apply to all the embodiments when there are no incompatibilities. Finally, only the notable, structural and functional differences between the embodiments will be described in this second part of the description, on the understanding that these differences may optionally find an application in several embodiments.

With reference to all of the figures, a device 1, 1', 1" for measuring temperature comprises a support 2, 2', 2" in the form of a plate having, protruding from the plate, a body 3, 3', 3" for supporting and protecting a temperature sensor 4, 4', 4", hereinafter called the supporting body 3, 3', 3" or body 3, 3', 3". The body 3, 3', 3" is in this instance wholly formed of plastic; it extends generally along an axis X, X', X" perpendicular to the overall plane of the plate 2, 2', 2" and is in this instance of generally cylindrical shape.

The support 2, 2', 2" in the form of a plate has two orifices 5 for attachment to the duct (represented only in FIG. 1), the orifices 5 being aligned with the supporting body 3, 3', 3" and arranged to be traversed by fastening elements designed to attach the support 2, 2', 2" to a wall of the gas duct, on an outer surface of this wall. The support 2, 2', 2" is connected to an electrical connector 6 (represented only in FIG. 1) making it possible to transmit the measurement signals from the temperature sensor 4, 4', 4" to acquisition means connected to the electronic control unit of the heat engine, in conventional manner.

The supporting body 3, 3', 3" is designed to be inserted, from the outside, into the gas duct through an orifice arranged in the wall of the latter, this orifice emerging on either side of the wall. Once the supporting body 3, 3', 3" is in position, the temperature sensor 4, 4', 4" that it supports is positioned in the gas flow of the duct. The supporting body 3, 3', 3" is held in position by the attachment of the support 2, 2', 2" to the duct. The sensor 4, 4', 4" swept by the gases flowing in the duct is used to measure their temperature in a manner that is conventional and well known to those skilled in the art.

For the purposes of simplification, the rest of the description will be made with reference to a Cartesian coordinate system comprising three axes (X, Y, Z), (X', Y', Z'), (X", Y", Z") which are at right angles to one another, these axes (X, Y, Z), (X', Y', Z'), (X", Y", Z") corresponding respectively to the longitudinal axis X, X', X" of the supporting body 3, 3', 3" and to two axes transversal to the latter, the body 3, 3', 3" of each of the embodiments being formed to be placed in the duct such that the general direction of flow of the flow of the gases is parallel to the direction Z, Z', Z"; thus, the coordinate system is defined with directions corresponding to the mounted state of the support of sensor 4, 4', 4" on a duct.

Moreover, the concepts of bottom or top are defined as the portions corresponding to the supporting body 3, 3', 3" in the representations of FIG. 2, 4, 5 or 6, depending on the embodiment described. They make it possible to position elements relative to one another and to also define notions of inside and outside the supporting body 3, 3', 3", wherein inside is that which is close to its axis X, X', X", and outside is that which moves away from it. According to the chosen convention, in operation, that is to say once the supporting body 3, 3', 3" is mounted in the duct, the top side of the body 3, 3', 3" corresponds to the inside of the duct and the bottom side of the body 3, 3', 3" corresponds to the outside of the duct.

The temperature sensor 4, 4', 4" comprises a head 7, 7', 7" supported by two wires 8, 8', 8" connected to the head 7, 7', 7" on one and the same (bottom) side of the latter. The head 7, 7', 7" of the sensor 4, 4', 4" is of substantially frustoconical shape, with a bottom side to which the wires 8, 8', 8" are connected and a top side forming its free end, in this instance of rounded shape; naturally, the sensor head 7, 7', 7" could have other shapes. The two wires 8, 8', 8" are rigid or semirigid in order to fulfill, with respect to the head 7, 7', 7", a structural supporting function, the head 7, 7', 7" being held only by the wires 8, 8', 8". The wires 8 are of such dimensions as to be sufficiently rigid so as not to twist when the sensor is placed in the gas flow.

The temperature sensor 4, 4', 4" is, for example, a thermistor of the NTC type. The head 7, 7', 7" is electrically connected to the two wires 8, 8', 8" which are electrically connected to the electric connector 6 for the transmission of the measurement signals; more precisely, in this instance, and in a known manner, the sensor head 7, 7', 7" forms part of an electric circuit in which the resistance at its terminals is measured, from which the temperature of the gases is deduced, since the resistance of the head 7, 7', 7" depends directly on the temperature to which it is exposed, that is to say, since it is placed in the gas flow, the temperature of the gases.

As illustrated in FIGS. 2 to 7, the body 3, 3', 3" comprises a bottom collar 12, 12', 12" with a general shape that is substantially cylindrical and allows the guidance, the passage and the holding of the wires 8, 8', 8" in channels 9, 9', 9" arranged in this collar 12, 12', 12". More precisely, the bottom collar 12, 12', 12" comprises a longitudinal side wall 12a, 12a', 12a" that is substantially cylindrical about the general direction X, X', X" of the body 3, 3', 3", this side wall 12a, 12a', 12a" being arranged to be inserted in an orifice arranged in the gas duct. In this instance, a seal 13, 13', 13" is placed on the periphery of the side wall 12a, 12a', 12a" of the collar 12, 12', 12" in a groove provided for this purpose; this seal 13, 13', 13" has the function of providing the seal between the collar 12, 12', 12" and the wall of the orifice arranged in the gas duct in order to prevent a gas leakage between them.

The channels 9, 9', 9" are arranged to allow the guidance of the wires 8, 8', 8" when they are installed in the supporting body 3, 3', 3". Once the sensor 4, 4', 4" is installed, the wires 8, 8', 8" are housed over at least a portion of their length in the channels 9, 9', 9" which thus keep them bent for the purpose of holding the sensor head 7, 7', 7" at a distance from a top end surface 17a, 17a', 17a" of the bottom collar 12, 12', 12". The sensor head 7, 7', 7" may thus be held while being disengaged over the whole of its periphery, since it is held, at a distance from the top end surface 17a, 17a', 17a" of the bottom collar 12, 12', 12", by the wires 8, 8', 8" held in their respective guidance and holding channels 9, 9', 9".

The supporting body 3, 3', 3" furthermore comprises a top framework 15, 15', 15" making it possible to mechanically protect the head 7, 7', 7" of the sensor 4, 4', 4", in particular during the installation of the supporting body 3, 3', 3" inside the gas duct, in order to prevent any contact of the head 7, 7', 7" with this duct.

The collar 12, 12', 12" is in this instance partly hollow, including outside the guidance channels 9, 9', 9", in order to place the inside of the duct in communication with a pressure sensor (not shown) housed in a bottom portion of the bottom collar 12, 12', 12".

With reference now to FIGS. 1 to 3 which represent the first embodiment of the supporting body 3 of the invention, the bottom collar 12 comprises a side wall 12a of substantially cylindrical shape and a top end wall 17 extending substantially transversally to the longitudinal axis X of the collar 12. The guidance and holding channels 9 are arranged in the thickness of this wall 17, in this instance pierced longitudinally in the latter.

A central channel 18 for the passage of the head 7 of the sensor 4 is furthermore arranged between the guidance channels 9; this passage channel 18 communicates with the channels 9 in order to allow the passage both of the head 7 and the wires 8 which are connected thereto. The central channel 18 has, in section in the plane (Y, Z), a diameter that is substantially equal to and slightly greater than the maximum diameter of the sensor head 7 in section in this plane (that is to say, the diameter of the sensor head 7 in orthogonal projection on this plane). In sectional view in the plane (Y, Z), the guidance and holding channels 9 are delimited by a wall that is substantially U-shaped, the base of the U having the shape of a circle of which the diameter is substantially equal to and slightly greater than the diameter of a wire 8 and the branches of the U allowing the passage of the connection portion for connecting the wire 8 to the sensor head 7 during installation. Thus, the channels 9 allow the guidance of the wires during the installation of the sensor 4 in the body 3 and then are used to hold them in position once the installation has been carried out; the diameter of the channels 9 (in this instance the diameter of the base of the U of which the walls that delimit them have the shape) is substantially equal to, optionally slightly greater than, the diameter of the wires 8, for a good hold of the latter.

Each channel 9 longitudinally encloses the wire 8 that it holds, while substantially matching the cylindrical shape of the wire 8. The hold is therefore exerted over the whole thickness (in the direction of the axis X) of the top wall 17. The channels 9 thus make it possible to keep the wires 8 bent, while allowing their movement and their guidance in the direction of the axis X when the sensor 4 is put in place in the supporting body 3. The wires 8 are kept bent by virtue of their being enclosed by the channels 9, in this instance over the whole thickness of the wall 17. The head 7 of the sensor 4 is only held in position by the wires 8, the latter being kept bent by the channels 9. The rigidity of the wires 8 and the length of the channels 9 are arranged so that this hold is sufficient to withstand the gas pulses to which the sensor head 7 is subjected in the pipe (the latter forming an inlet pipe of an internal combustion heat engine of a motor vehicle). The sensor head 7 can therefore be kept at a distance from the top end surface 17a of the top transverse wall 17 of the collar 12, which in this instance forms the top end surface 17a of the collar 12.

In the embodiment shown, the wires 8 have an arched portion 20 close to the sensor head 7 and extend, in their portion below this arched portion 20, in a straight line and parallel with one another in the guidance and holding channels 9. The arched portions 20 are in this instance arranged between the head 7 and the guidance and holding channels 9. The distance between centers of the wires 8 is thus greater than the diameter of the head 7. The wires 8 touch the edge of the channels 9.

A recess 21 in the form of a half-disk is arranged in the top wall 17 (the channels 9, 18 for the sensor 4 are arranged on one side of the wall 17 and the recess on the other side). This recess 21 communicates fluidically with a pressure sensor arranged to measure the pressure of the gases flowing in the duct, as mentioned above.

As illustrated in FIGS. 2, 3 and 4, the top framework 15 comprises a ring 22 supported by three longitudinal pillars 23a, 23b, 23c protruding from the top end surface 17a of the top wall 17, over its outer periphery. Note that the top end surface 17a of the top wall 17 also corresponds to the top end surface of the side wall 12a of the collar 12, this surface 17a forming the top end surface 17a of the bottom collar 12.

The channels 9, 18 for the passage of the head 7 and of the wires 8 of the sensor 4 are situated, in the top wall 17, substantially between two upstream longitudinal pillars 23a, 23b, at a distance from the outer limit of the periphery of the top end surface 17a. More precisely, the channels 9, 18 extend on the inside of the supporting body 3 relative to these pillars 23a, 23b, the two pillars 23a, 23b being aligned, in sectional view in the plane (Y, Z), in the direction parallel to the axis Y, that is to say perpendicularly to the direction Z of flow of the gases; thus, the head 7 of the sensor 4 is directly subjected to the flow of gas since it is aligned with no upstream pillar 23a, 23b in the direction Z of flow of the gases; it is aligned with the downstream pillar 23c but that is of no importance for its exposure to the flow of gas.

Thus, the head 7 of the sensor 4 is situated in a volume 24 of the supporting body 3 delimited laterally by the three longitudinal pillars 23a, 23b, 23c, on a top portion by the ring 22 and on a bottom portion by the top end surface 17a of the transverse wall 17 of the collar 12. It is more precisely held inside the supporting body 3 at a distance from the elements forming its bottom collar 12 and forming its top framework 15; the whole of the periphery of the sensor head 7 is thus disengaged, notably upstream and downstream in the direction Z of flow of the gases, which improves the quality of the temperature measurement, since the sensor head 7 does not have too great a thermal inertia associated with its immediate environment.

According to other embodiments not shown, the shape, the number and the arrangement of the longitudinal walls 23a, 23b, 23c and of the top framework 15 may be different.

The installation of the temperature sensor 4 in the supporting body 3 is carried out by the movement of the temperature sensor 4 from the inside of the bottom collar 12 toward the top framework 15, in translation parallel to the axis X. The head 7 of the sensor 4 and the wires 8 are respectively moved and guided in the passage recess 18 and the guidance channels 9 to their final installation position protruding from the top wall 17a of the collar 12.

According to a variant of the first embodiment illustrated in FIG. 4, two supporting tongues 25 for the wires 8 are placed protruding from the top end surface 17a of the top wall 17, each supporting tongue 25 being arranged to form a support for a wire 8.

Each wire 8 and its supporting tongue 25 are aligned in the direction Z of flow of the gases, each supporting tongue 25 thus complementing the keeping-bent action of the channel 9 for the guidance and holding of the wire 8. Accordingly, each supporting tongue 25 extends downstream (relative to the direction of flow of the gases) of the channel 9 for the guidance and holding of the wire 8 for which it serves as a support. More specifically in this instance, each supporting tongue 25 is arranged to force the wire 8 to rest against an upstream surface of the corresponding channel 9.

The supporting tongues 25 extend generally parallel to the axis X of the supporting body 3 and have in this direction a length such that their top end surface 25b extends at a distance from the bottom end surface of the sensor head 7. In other words, the supporting tongues 25 are shorter than the portion of the wires 8 protruding from the top end surface 17a of the collar 12.

In this instance, each supporting tongue 25 has at its top free end a protuberance 25a or swelling 25a formed on the upstream side of the tongue 25. This swelling 25a serves as a surface to support the wire 8, for example at the arched portion 20 of the wire 8.

The supporting tongues 25 make it possible to increase the clearance left between the wires 8 and their channels 9, which makes it easier to install the temperature sensor 4 in the supporting body 3, the sensor 4 being easily inserted into the channels 9, 18 until the wires 8 butt against the swellings 25a of the tongues 25, which then forces, for the end of its travel, the sensor 4 to be positioned in a position in which each wire 8 is jammed and therefore well held in position between the swelling 25a of a tongue 25 and the upstream surface of the corresponding channel 9.

The presence of the tongues 25 has little impact on the response time of the sensor 4, since the head 7 of the sensor 4 is disengaged over its periphery and extends at a distance from the supporting tongues 25 and in particular from their top end surfaces 25b.

Figure 5:
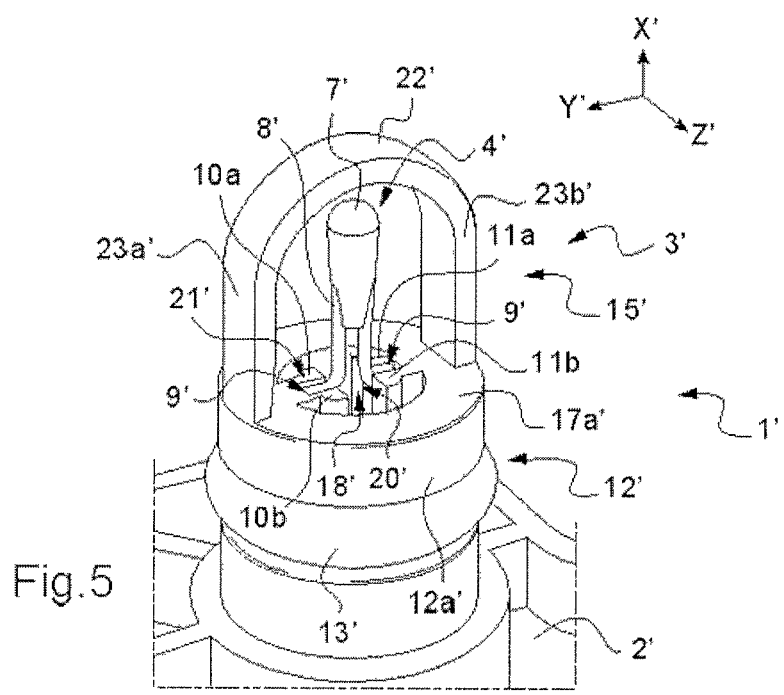
FIG. 5 represents a schematic view in perspective of a second embodiment of the device for measuring temperature of the invention.

In a second embodiment of the device 1' illustrated in FIG. 5, the bottom collar 12' comprises a longitudinal side wall 12a' of cylindrical shape and having, protruding radially on its inner surface, two pairs of longitudinal legs (10a, 10b), (11a, 11b), the legs (10a, 10b), (11a, 11b) of each pair of legs arranging between them a channel 9' for the guidance and holding of the wires 8' of the sensor 4'. More precisely, the legs (10a, 10b), (11a, 11b) of each pair of legs extend parallel with one another and with the direction of the main axis X' of the supporting body 3'; the pairs of legs (10a, 10b), (11a, 11b) are arranged facing one another, diametrically opposed in sectional view in the plane (Y', Z') transversal to the axis X' of the supporting body 3'. The pairs of legs (10a, 10b), (11a, 11b) and hence the channels 9' are in this instance symmetrical relative to the axis X' of the supporting body 3'; in the installation position, the sensor 4' therefore extends in a central position of the supporting body 3'.

The shape of the channels 9' depends on the shape of the legs; the surfaces defining the channels 9' can for example have, in sectional view in the plane (Y', Z'), a U shape. A channel 18' for the passage of the head 7' of the sensor 4' is arranged between the inner surfaces of the free ends of the legs (10a, 10b), (11a, 11b). More precisely, the free ends of the legs (10a, 10b), (11a, 11b) comprise swellings directed toward the outside and on the inside of which are arranged recesses of curved shape. The result of this is a tapering between the legs (10a, 10b), (11a, 11b) of each pair of legs of which the shape complements the outer shape of the portion of largest diameter of the head 7' of the sensor 4'. The legs (10a, 10b), (11a, 11b) thus arrange a channel 18' for the passage of the sensor head 7', allowing the passage and guidance of the latter when it is installed in the supporting body 3'. In this instance, the outer surfaces of the free ends of the legs (10a, 10b), (11a, 11b) form swellings so that the thickness of the legs (10a, 10b), (11a, 11b) is substantially constant in cross-sectional view (in the plane (Y', Z')). The legs (10a, 10b), (11a, 11b) have an elasticity allowing them to deform slightly elastically during the movement and the guidance of the sensor head 7' along the inner surfaces of their free ends, the legs (10a, 10b), (11a, 11b) returning to position after the passage of the sensor head 7'.

Furthermore, the legs (10a, 10b), (11a, 11b) have top end surfaces flush with the top end surface 17a' of the side wall 12a' and forming with it the top end surface 17a' of the bottom collar 12'.

According to a variant not shown, it is possible for the top end surface of the legs not to extend to the same level as the top end surface of the side wall. In any case, the top end surface of the collar is formed by the uppermost end surface and the assembly is arranged so that the holding of the sensor is carried out with the sensor head kept at a distance from this top end surface of the collar.

The holding in position of the sensor head 7' is provided by the wires 8' and the keeping bent of the wires 8' is provided by the channels 9' arranged between the legs (10a, 10b), (11a, 11b). In this instance, the wires 8' have an arched portion 20' substantially at the level of the top end surface 17a' of the collar 12'; more precisely, the wires 8' extend parallel with one another above and below this arched portion 20' but are further apart from one another beneath the arched portion 20'; the arched portion 20' therefore has a curvature and an inversion of curvature in order to make it possible to return to the parallelism on either side of the arched portion 20'.

The top framework 15' comprises, in this second embodiment, an arch comprising two longitudinal pillars 23a', 23b' protruding from the top end surface 17a' of the bottom collar 12' and connected to one another by a transverse wall 22' of curved shape and in this instance substantially circular in projection in the plane (X', Y'). This arch 15' makes it possible to protect the sensor 4', in particular during its installation.

More precisely, the two longitudinal pillars 23a', 23b' are diametrically opposed on the top end surface 17a' and are substantially aligned with the head 7' of the sensor 4' in the plane (X', Y').

Thus, the sensor head 7' is centered in the supporting body 3', at a distance from the longitudinal pillars 23a', 23b' and from the transverse wall 22'. The body 3 may be mounted such that the sensor head 7' is aligned, on its upstream side, with none of the longitudinal pillars 23a', 23b' in the direction Z' of flow of the gases, which allows the sensor head 7' to be directly exposed to the flow of gas without the longitudinal pillar or pillars 23a', 23b' of the framework 15' causing an obstruction to the gases.

It is also possible to envisage installing the body 3 such that the two longitudinal pillars 23a', 23b' are aligned with the sensor head 7' in the direction Z' of the flow of the gases.

In practice, the body 3 may be mounted in any chosen angular position defining an angle of arrival of the gases on the sensor head 7'.

The sensor 4' is placed inside the supporting body 3' by the movement and the guidance of the wires 8' in their respective guidance channels 9', the sensor head 7' being for its part guided in its passage channel 18'.

Again, a recess 21' makes it possible to place the inside of the gas duct in fluidic communication with a pressure sensor.

Figure 6:
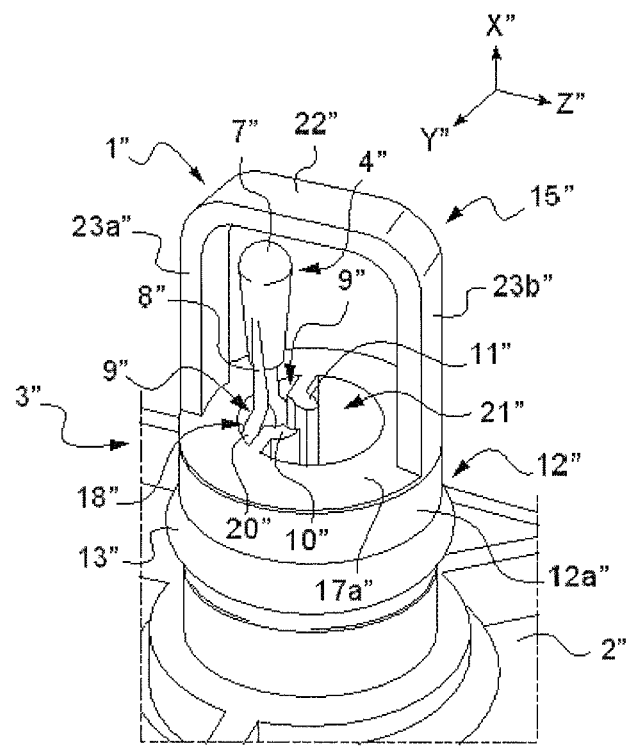
FIGS. 6 and 7 represent respectively a schematic view in perspective and a schematic view from above of a third embodiment of the device for measuring temperature of the invention.
Figure 7:
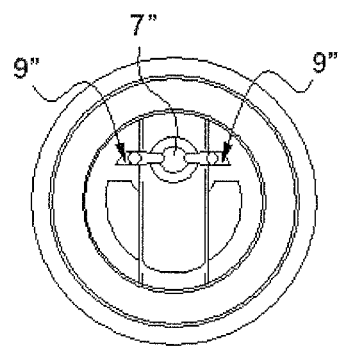

In a third embodiment of the device 1" illustrated in FIGS. 6 and 7, the bottom collar 12" comprises a longitudinal side wall 12a" of cylindrical shape and having, in radial protrusion on its inner surface, two longitudinal legs 10", 11", each leg 10", 11" arranging, with a facing portion of the side wall 12a", a channel 9" for guiding and holding a wire 8".

In this instance, the two longitudinal legs 10", 11" extend parallel with one another and symmetrically relative to the plane (X", Z"). Each leg 10", 11" extends at a distance from a facing surface of the side wall 12a" corresponding substantially to the diameter of a wire 8", in order to arrange a channel 9" with a diameter corresponding substantially to the diameter of a wire 8", slightly greater, as in the previous embodiments.

A channel 18" for passage of the head 7" of the sensor 4" is arranged both in the side wall 12a" and between the inner surfaces of the free ends of the legs 10", 11", in order to fulfill a function equivalent to the passage channels 18, 18' of the previous embodiments.

As previously, the inner surfaces of the free ends of the legs 10", 11" are of curved shape with a shape matching the portion of largest diameter of the sensor head 7", in order to allow its passage and its guidance, while the outer surfaces form a swelling designed to keep the thickness of the legs 10", 11" substantially constant.

The sensor head 7" is therefore kept at a distance from the top end surface 17a" of the bottom collar 12", the head 7" being held by the wires 8" themselves held by the channels 9". Furthermore, the wires 8" have an arched portion 20" close to the top end surface 17a" of the bottom collar 12", this arched portion 20" being of similar shape to that of the second embodiment of FIG. 5.

Finally, the top framework 15" of the supporting body 3" comprises an arch comprising two longitudinal pillars 23a", 23b" protruding from the top end surface 17a" of the bottom collar 12". The longitudinal pillars 23a", 23b" are connected to one another by a transverse wall 22" of generally rectilinear shape, the zone of junction between each longitudinal pillar 23a", 23b" and the transverse wall 22" being curved.

The sensor head 7" is sufficiently far from the pillars 23a", 23b" and sufficiently disengaged on its periphery for the presence of the pillars 23a", 23b" in the direction Z" of flow of the gases not to adversely affect its response time.

Again, a recess 21" makes it possible to place the inside of the gas duct in fluidic communication with a pressure sensor.

Naturally, it can be envisaged to place the two longitudinal pillars 23a", 23b" in the plane (X, Y) transverse to the direction Z" of flow of the gases.

The sensor 4" is put in place by moving and guiding the head 7" of the sensor 4" and the two wires 8" in the recess 18" for passage of the head and in the two channels 9", respectively, from the bottom collar 12" to the top framework 15".

Figure 8:
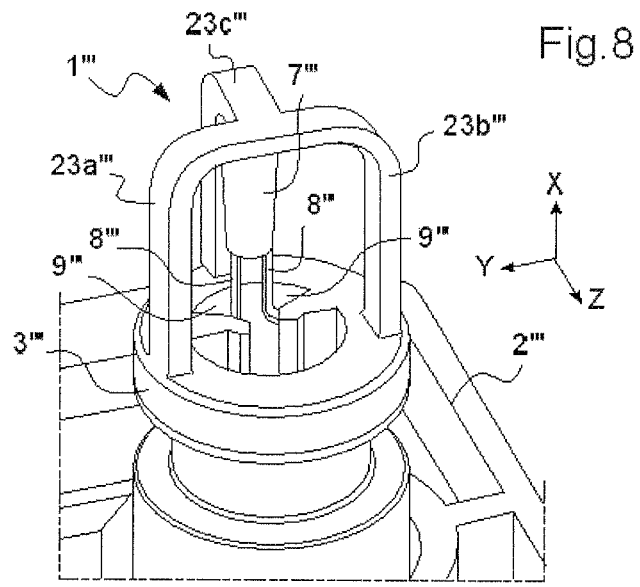
FIGS. 8 to 10 represent a fourth embodiment of the invention.
Figure 9:
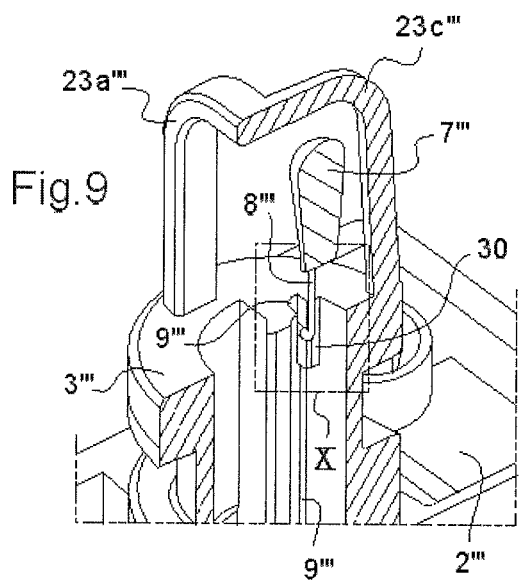
Figure 10:
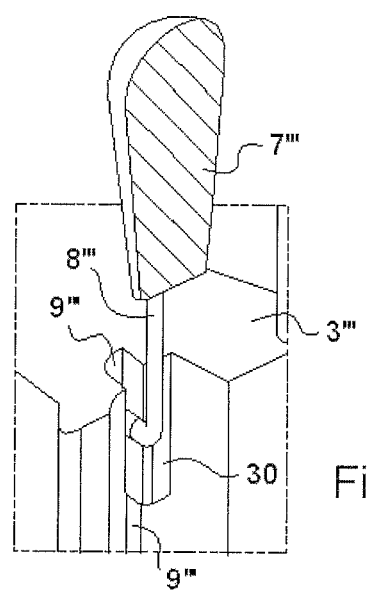

FIGS. 8 to 10 represent a fourth embodiment of the invention. With reference to the view in perspective of FIG. 8, the device 1''' for measuring temperature comprises a support 2''' from which emerges a body 3'''. The latter comprises a sensor head 7''' held by its wires 8''' in channels 9'''.

This embodiment differs from the foregoing in that it comprises a protection for the sensor head 7''' which is made only of three pillars 23a''', 23b''', 23c''' which join above the sensor head 7'''.

Another notable feature of this fourth embodiment is a variant in the holding of the wires 8''' in the channels 9'''. With reference to FIG. 9, which corresponds to a section of FIG. 8, the channel 9''' that can be seen comprises a boss 30 which reduces its width locally. Each channel 9''' has this same boss 30.

The wires 8''' are in this instance tapered in the same way as in the example of FIG. 5, and benefit from an additional hold by being pinched in the zone of the boss 30, at the entrance of the channel 9''' (see FIG. 10 which is an enlargement of the inset X of FIG. 9).

Where the wires 8''' taper, they also each touch the longitudinal edge of the corresponding channel 9'''.

The wires 8''' are thus perfectly held in the direction X by the pinching in the bosses 30, in the direction Y by their being trapped against the longitudinal edges of the channels 9''', and in the direction Z by their being jammed in the walls of the channels 9'''.

The invention has been described with reference to the preferred embodiments, but it goes without saying that other embodiments can be envisaged. In particular, the features of the various embodiments described can be combined if there are no incompatibilities. Moreover, the device can advantageously fulfill an additional function by comprising a pressure sensor housed in the support 2, 2', 2", 2''' or the body 3, 3', 3", 3'''.

The invention claimed is:

1. A device for measuring temperature in a gas duct, the device comprising:
   a body for supporting a temperature sensor, the sensor comprising:
     a head, and
     at least two wires connecting the head to means for acquiring a temperature-measurement signal,
   the supporting body being arranged to be inserted into an orifice of a wall of the gas duct in order to immerse the head of the sensor into gases of the duct,
   wherein the supporting body comprises a bottom collar, having a top end surface, in which are arranged at least two channels for guiding and holding the wires, arranged to allow the mounting of the sensor in the supporting body and the holding of the wires in order to hold the head of the sensor at a distance above the top end surface of the collar,
   wherein the supporting body comprises a top framework that mechanically protects the head of the sensor, and the top framework protrudes from the top end surface of the bottom collar, arranging at least one passage for the gases and consisting of walls all extending at a distance from the head of the sensor,
   wherein the top framework comprises at least one longitudinal pillar aligned with the head of the sensor in a direction that exposes an upstream side of the head of the sensor to a flow of the gases, and wherein the gases flow generally in one direction and the wires are kept bent in said direction of flow of the gases to prevent the wires from flexing due to exposure to the flow of the gases.

2. The device for measuring temperature as claimed claim 1, wherein the bottom collar comprises a channel for the passage of the head of the sensor so that the head of the sensor is mounted in the supporting body.

3. The device for measuring temperature as claimed in claim 1, wherein each wire is arched close to the head of the sensor between the head of the sensor and the guidance and holding channel and/or close to the top end surface of the collar.

4. The device for measuring temperature as claimed in claim 1, wherein the width of the channels is substantially equal to the diameter of the wires.

5. The device for measuring temperature as claimed in one claim 1, wherein, since the bottom collar extends generally along an axis, the bottom collar further comprises a wall substantially transverse to an axis in which the channels are arranged, the channels being pierced longitudinally in said wall.

6. The device for measuring temperature as claimed in claim 1, wherein, since the bottom collar extends generally along an axis and comprises at least one side wall, the bottom collar further comprises at least two longitudinal legs protruding radially inside said side wall, each channel being arranged between a leg and the side wall of the collar.

7. The device for measuring temperature as claimed in claim 1, wherein, since the bottom collar extends generally along an axis and comprises at least one side wall, the bottom collar further comprises two pairs of longitudinal legs protruding radially inside said side wall, each pair of legs arranging a channel.

8. The device for measuring temperature as claimed in claim 1, comprising at least one supporting tongue for a wire, protruding from the top end surface of the bottom collar and of which a top end surface extends at a distance from the head of the sensor.

9. The device for measuring temperature as claimed in claim 8, wherein, since the gases flow generally in one direction, the wire and the at least one supporting tongue are aligned in said direction of flow of the gases.

10. The device for measuring temperature as claimed in claim 8, wherein the supporting tongue is arranged to force the wire to rest against an inner surface of its guidance and holding channel.

11. The device for measuring temperature as claimed in claim 1, wherein the channels comprise at least one boss for pinching the wire.

12. The device for measuring temperature as claimed in claim 1, wherein the duct is a gas inlet duct of a heat engine of a motor vehicle.

13. A heat engine of a motor vehicle connected to at least one duct comprising a device for measuring temperature as claimed in claim 1.

14. A motor vehicle comprising a heat engine connected to at least one duct comprising a device for measuring temperature as claimed in claim 1.

15. A device for measuring temperature in a gas duct, the device comprising:
a body for supporting a temperature sensor, the sensor comprising:
a head, and
at least two wires connecting the head to means for acquiring a temperature-measurement signal,
the supporting body being arranged to be inserted into an orifice of a wall of the gas duct in order to immerse the head of the sensor into gases of the duct,
wherein the supporting body comprises a bottom collar, having a top end surface, in which are arranged at least two channels for guiding and holding the wires, arranged to allow the mounting of the sensor in the supporting body and the holding of the wires in order to hold the head of the sensor at a distance above the top end surface of the collar,
wherein the supporting body comprises a top framework that protects the head of the sensor during installation, and the top framework protrudes from the top end surface of the bottom collar, arranging at least one passage for the gases and consisting of walls all extending at a distance from the head of the sensor,
wherein the top framework comprises at least one longitudinal pillar aligned with the head of the sensor in a direction that exposes an upstream side of the head of the sensor to a flow of the gases, and
wherein the gases flow generally in one direction and the wires are kept bent in said direction of flow of the gases to prevent the wires from flexing due to exposure to the flow of the gases.

* * * * *